Patented Apr. 9, 1940

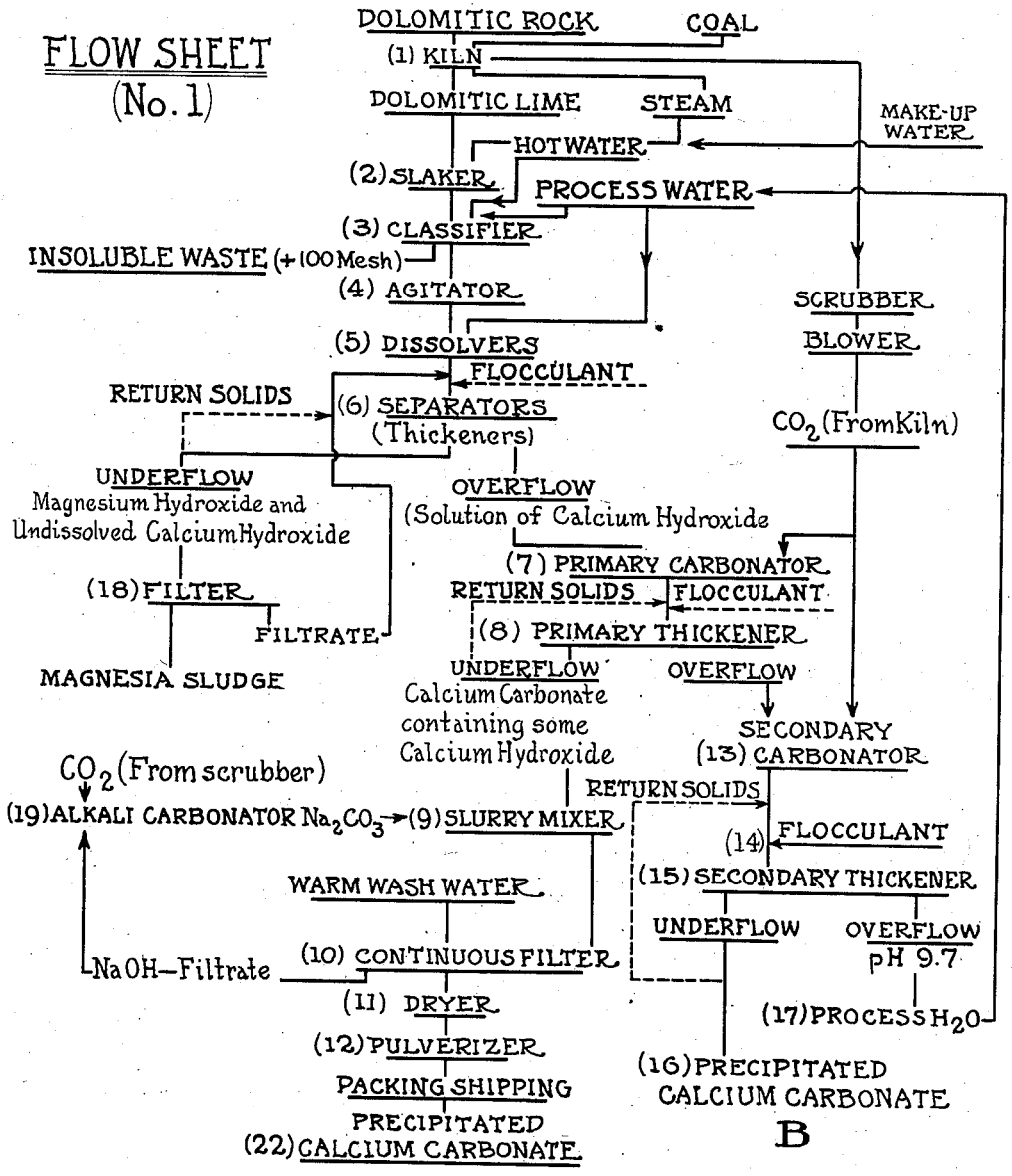

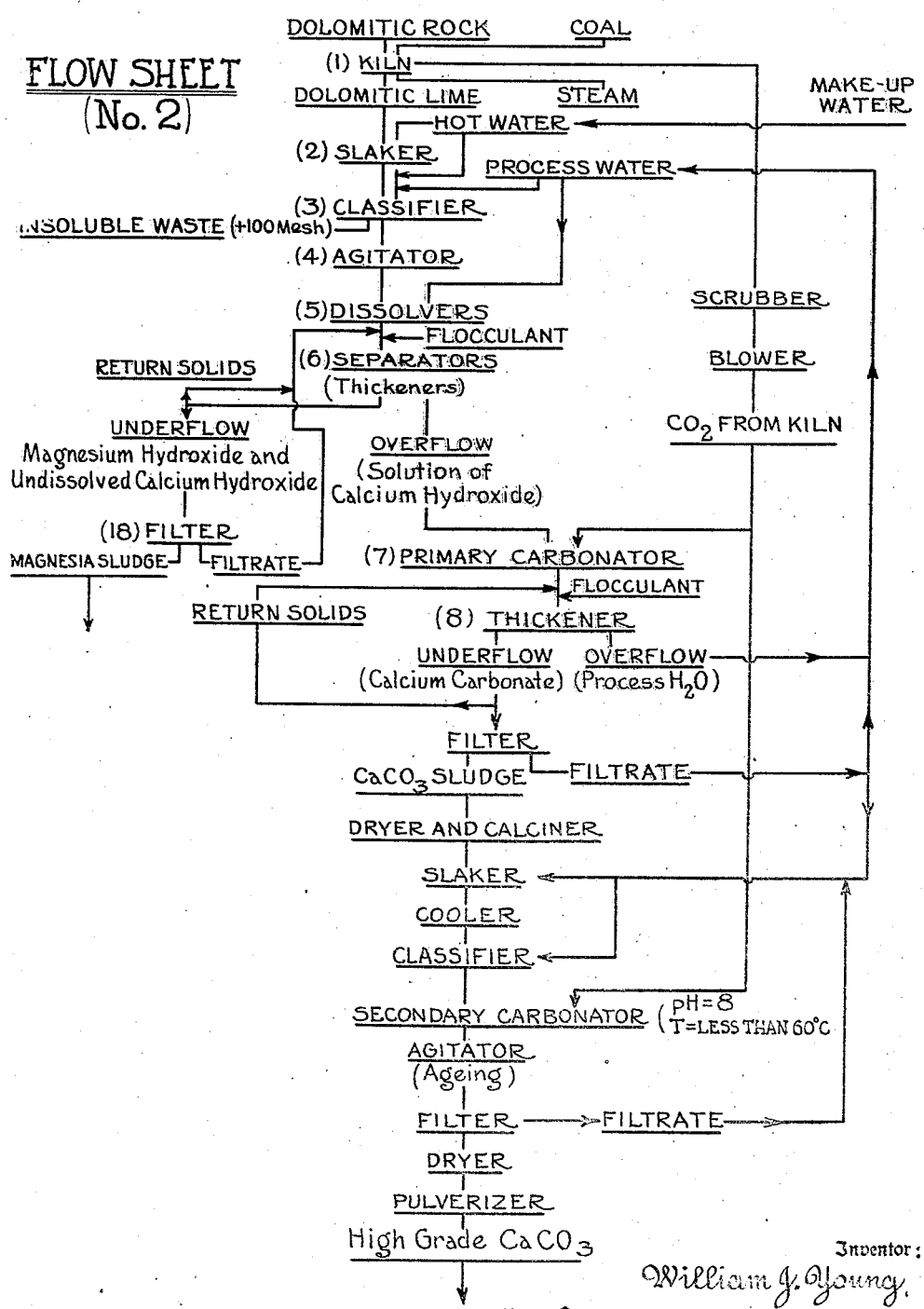

2,196,949

UNITED STATES PATENT OFFICE 2,196,949

PROCESS OF TREATING MAGNESIA-CONTAINING LIMESTONES

William J. Young, Charles Town, W. Va., assignor to The Standard Lime and Stone Company, Baltimore, Md., a corporation of Maryland Application February 11, 1938, Serial No. 190,126

28 Claims. (Cl. 23—66)

This invention pertains to an improved process of treating magnesia-containing limestones, to produce magnesia and calcium products therefrom.

The application is a continuation in part of my prior application, Serial No. 133,286, filed March 26, 1937, the subject matter whereof will first be recited, with certain emendations, and then a modification of said process will be given, which modified process has been found to produce more highly satisfactory results in a shorter period of time, while still utilizing in the main the steps of the process of the aforesaid application, Serial No. 133,286, and allowing the employment of smaller apparatus elements.

Methods have been proposed to produce from magnesian limestones, such as dolomite, a high magnesia product. In the main, these methods are directed to the extraction of magnesia from the dolomite, or the elimination of calcium oxide to produce a product high in magnesia. The methods, for the most part, depend on differences in the chemical behavior of various compounds of magnesium and calcium. However, none of the prior methods have proved sufficiently economical to permit their use for the manufacture of a high magnesia base for use in the manufacture of refractories. The operating costs of the prior art methods have been too high to produce a magnesia product that could compete with dead burned magnesite for use as a refractory. The only method which has been successfully worked out and applied on a commercial scale is the Pattinson method and its modifications, which results in a very pure basic magnesium carbonate used for insulating purposes, and for manufacture of magnesia for the chemical and pharmaceutical industries, but too expensive to use in refractories.

The present invention is based on the great difference in solubility of calcium hydroxide and magnesium hydroxide in water, calcium hydroxide being of the order of fifty times more soluble in water than magnesium hydroxide. Although it has been previously proposed to utilize this difference in solubility as a basis for processes for the production of a high magnesia product from dolomite, none of these processes have been practicable nor have any been put into operation because of a lack of understanding of certain critical conditions controlling the solution of the lime and because of the inability to separate and recover the solids from the very dilute suspensions obtained except by methods entailing prohibitive costs.

The present invention provides an efficient method of treating magnesium-containing limestones, and particularly calcined dolomite, for the separation of the calcium from the magnesium contents thereof based upon the relative solubility of calcium hydroxide and magnesium hydroxide in water.

It provides for reducing the volume of fresh water ordinarily required by removing dissolved calcium hydroxide from the water as calcium carbonate and reusing the water for further treatment of calcined dolomite. It provides a high magnesia product containing up to 90% magnesia or more and a precipitated calcium carbonate suitable for many uses. By special treatment it produces a portion of this precipitated calcium carbonate of such physical properties as to be especially suited for uses commanding especially high prices such as paper coating and filler. The present invention further provides for carrying out the process and steps described in a manner and under conditions such that the process is of proven practicable operation and obvious commercial application, in distinction to other proposed similar processes, none of which have ever been proven practical or of commercial value.

In accordance with the present invention, the limestone is calcined and slaked, preferably to a milk of lime. The solid particles and aggregates present in the milk of lime are reduced to a finely dispersed state, whereby the calcium content is made more completely amenable to solution, and this may be accomplished by violent agitation of the milk of lime. However, preferably, the dispersion of the particles of the milk of lime is effected by a combined classifying and agitation treatment. The classification treatment, such as may be desirably effected in a Dorr classifier, removes undesirable and contaminating materials, such as overburned and underburned lime, sand, stone, and other foreign materials and impurities, and also lumps and agglomerations of the hydrated material that cannot be readily dispersed, and the presence of which reduces the magnesia content of the final magnesia product. It may be pointed out that the material to be classified is a very dilute suspension of the character hereinafter set forth. Preferably, the classification is effected so as to remove particles larger than about 100 mesh.

The thoroughly dispersed and classified milk of lime is subjected to the action of an aqueous dissolving agent with violent agitation, the agent preferably having a pH within the range of approximately 9.6 to 9.8, to produce a dilute solution containing dissolved calcium hydroxide and undissolved calcium and magnesium hydroxides in suspension. These undissolved hydroxides are separated and recovered. The substantially clear solution separated from the solids is then subjected to treatment to convert at least a portion of the calcium content to calcium carbonate, and this solid material is separated and recovered. It may be pointed out that while the preferred procedure, for reasons herein pointed out, is to effect carbonation in two steps, in some cases the carbonation may be effected in one step, and substantially all of the solution carbonated at one time. The solution separated from the partial carbonation may again be treated to convert nearly all the remaining calcium content to calcium carbonate. These solids are separated and recovered.

It is desired to point out that the calcium and magnesium components suspended in the aqueous solution, as above set forth, are subjected to an aqueous dissolving operation to produce a magnesium-containing product having present a calcium component, and that the amount of calcium component present is regulated by controlling the amount of dissolving solution used and the time of solution, the less the magnesium content of the final product and higher the lime content of the final product, the less the volume of water used and the solution time.

It has further been discovered that an efficient solution of the lime may be obtained only if the magnesium-containing limestone or dolomite be calcined under closely controlled conditions of burning, such that the calcium carbonate is completely calcined and yet not overburned. If the calcination is carried out at a temperature considerably above the temperature necessary to dissociation of the carbon dioxide from the oxides (which is approximately 750° C.), then the solubility of the resulting lime is too low for efficient carrying out of the present process. Preferably, the lime is burned under conditions to produce what is known as "soft burned lime", said conditions being well known in the art.

Producing soft burned lime and treating such lime while still hot enters directly into the commercial success of the process. Seemingly, this is due to the fact that the internal heat of the lime is conducive to extremely rapid and violent slaking, whereby the lime particles are forced asunder into a finely divided condition, thus furthering the subsequent contact between the water and the finely divided particles of the calcined lime.

Heat alone is not thus effective if the lime is allowed to cool and is afterwards reheated, apparently because such action introduces carbon dioxide from the atmosphere whereby the effect of rapid slaking, above described, is partially defeated.

It is recognized that the solubility of the resulting slaked lime is greater if the lime is slaked before it has completely cooled. As illustrative thereof, it may be stated that the lime may be slaked after burning when the temperature thereof falls within a range of the order of 149° C. to 177° C.

It has been ascertained that the solubility of the lime is greater if the water used in slaking is heated to a temperature above 50° C. Preferably, the temperature will be carried as high as is possible short of producing too much steam when the slaking operation takes place.

Further, the solubility of the lime in water is greater if the quantity of water or any other aqueous medium used for slaking the calcined dolomite, or other lime base, is in excess of the chemical requirements necessary to form the hydrates; or, stated differently, if the amount of water used is sufficient to produce a milk of lime.

It is desired to point out that the present method is a continuous one. The thoroughly dispersed and classified milk of lime is subjected to solution in dissolvers, which are equipped with agitators to produce violent agitation, in which milk of lime and process water are fed continuously. The dissolving operation is best carried out at low temperatures, as of the order of 20 to 25° C., which is representative of average atmospheric temperature. While higher temperatures may be used, in general, it is desirable that the temperature of the dissolved solution be not above atmospheric temperature. It may be pointed out that refrigeration of the water increases the solubility of the lime to a certain extent. However, it may be noted that it is not commercially feasible to refrigerate thousands of gallons of water per minute, and so even if the initial dissolving step is carried out at a low temperature, varying just above the freezing point of the solution to atmospheric temperature, the advantage of increased solubility would be lost, since ultimately a certain amount of the calcium would drop out of solution.

It is desirable to carry out the dissolving operation in high speed agitators at a low temperature and with process water having a pH insuring the maximum solvent action of the water for the lime hydroxide, and this has been found to be within the range of 9.6 to 9.8. As departure from this range is made, the solvent action of the solvent water decreases. Under these controlled conditions, the solution of calcium oxide takes place at the rate of 1 part of calcium oxide to 1000 to 1250 parts of water in from 2 to 8 minutes.

It may be pointed out that the dissolving operation is carried out in a very short time, and this is in direct contrast to the prior art methods. Further, preferably, the solution operation and the removal of solids is a continuous operation. It is believed that the increased speed of solution and removal of calcium oxide from the solid particles in suspension is accomplished by the continuous exposure of fresh surfaces of the particles of calcium and magnesium hydroxides to the dissolving action of the process water, this continuous exposure of fresh surfaces being a result of the violent agitation of the suspension. This agitation removes from the surface of the particles the film of insoluble magnesium hydroxide as fast as the lime or calcium hydroxide is dissolved, and also removes the solution which has dissolved the lime and is in contact with the particles thereof, and replaces this solution with process water less saturated with lime and having a more efficient solvent action.

In accordance with the present invention, the lime is made more accessible to the dissolving action of the water, or other aqueous medium employed, than has hitherto been recognized as necessary, and than has been achieved in the methods heretofore proposed and described, said methods being incapable of commercial utilization and operation. The utilization of the discoveries herein set forth provides for an efficiency and rapidity of solution of the calcium or lime content of the suspension not previously obtainable, and thereby affords a method of practical value.

The lime solution from the dissolvers with the magnesium hydroxide and some lime in suspension, passes continuously to separators in which the solids are collected and removed. These separators are really thickeners which concentrate a relatively dilute pulp into a thick pulp, and overflow a substantially clear calcium hydroxide solution. The time may be decreased by the addition of reagents that cause the solids to flocculate. Examples of suitable flocculating agents are glues and starches.

The underflow from the thickener is passed to a filter and a sludge of magnesium hydroxide is obtained having, illustratively, the following composition on a calcined basis:

|  | Per cent |
|---|---|
| MgO | 90 |
| CaO | 9 |
| Impurities | 1 |

If a sludge of lower magnesia-content and higher lime-content is desired, a less volume of water and less solution time is required, there being considerable latitude in the process as to the amount of lime separated and dissolved from the original slaked calcium and magnesium-containing material.

The overflow from the thickener or from a battery thereof, is a substantially clear, very dilute solution of calcium hydroxide from which the lime may be recovered by any of the prior art methods, although it is preferred to recover the lime as calcium carbonate. The carbon dioxide produced during the calcination of the dolomite or other initial starting material, is preferably cleaned, as for example, in gas scrubbers and introduced, preferably under pressure, into the calcium hydroxide solution, the carbonation being carried out in what is herein termed a carbonator. This carbonation results in the formation of suspended calcium carbonate in the process water. The suspension of calcium carbonate passes from the carbonator to a primary thickener where a separating action takes place to produce calcium carbonate usually containing some calcium hydroxide and an overflow containing some calcium hydroxide which has not been carbonated. The separation in the primary thickeners may be greatly accelerated by the addition of flocculating agents of the character previously described. The recovered calcium content which may be in the form of calcium carbonate sludge, may be filtered, dried and pulverized.

It has previously been proposed to recover the calcium content of a lime solution as calcium carbonate by passing $CO_2$ gas into solution and to use the recovered calcium carbonate as a whiting substitute. It has been discovered, in accordance with the present invention, that the physical characteristics of the precipitated calcium carbonate are dependent on the conditions under which it is precipitated. It has been ascertained that the recovery of the lime content of the solution may be effected so that a considerable portion of the lime is recovered as precipitated calcium carbonate of superior quality, which is suitable for such uses as a paper filler and a paper coating.

In accordance with the present invention, there is effected a rapid but carefully controlled primary partial carbonation of the lime solution which overflows from the magnesia separators. In other words, all the lime content is not carbonated, but only a portion thereof.

Preferably, the carbonating agent is introduced in the primary carbonator in an amount insufficient to completely carbonate the lime solution. The amount of carbonating agent that is introduced is that quantity which will produce a calcium carbonate of exceedingly fine and uniform particle size containing a small proportion of calcium hydroxide. It has been ascertained that the character of the calcium carbonate precipitated in the primary carbonator depends upon the hydrogen ion concentration of the solution, and in order to obtain a substantial amount of high grade calcium carbonate, the carbonation operation is carried out in two steps, the first step in a primary carbonator and the second in a secondary carbonator.

In the primary carbonator, the pH value of the solution is maintained at approximately 11.5, to thereby precipitate in the primary carbonator a large proportion of very fine calcium carbonate particles which impart a peculiar character to the product, which is designated as "smoothness" or "finish". In other words, the lack of appreciable grain is highly advantageous. If the carbonation in the primary carbonator is carried to a point beyond that represented by a pH of 11.5, the precipitated calcium carbonate will be of a more crystalline and grainy nature with larger crystals than is desirable in the finished product having the characteristics above referred to.

It may be stated that the individual particles should as a rule be smaller than 1 micron. As the alkaline value of the solution is reduced, the formation of the calcium carbonate crystals is changed in character. The alkaline value of the solution in the primary carbonator may be controlled by the amount of carbon dioxide gas introduced therein.

When the primary carbonation is carried out and calcium carbonate is precipitated, a portion at least of the calcium hydroxide is trapped and passes to the primary thickener and is recovered therefrom in the underflow product consisting almost entirely of calcium carbonate with some calcium hydroxide which usually, although not necessarily, may vary between 1% to 5%. There is thus produced a calcium carbonate of exceedingly fine and uniform particle size, containing a small proportion of free calcium hydroxide, which latter has been trapped by the calcium carbonate, out of the substantially but not perfectly clear solution. This small quantity of unconverted hydroxide would be detrimental to the commercial precipitated high grade calcium carbonate for certain purposes, such as paper filling and coating. The presence of the calcium hydroxide demands an extra expenditure of such relatively expensive materials as casein, where such calcium carbonate is to be employed in paper making and finishing.

Therefore, this calcium hydroxide must be converted, but preferably will not be converted in the primary carbonation step because such conversion by $CO_2$ would produce a coarser calcium carbonate than is demanded. Such conversion may be accomplished by treating the solids with any carbonating agent but preferably with a water soluble carbonate which is an alkali carbonate, for example, sodium carbonate, or it may be treated with carbon dioxide, or both, to thereby carbonate the calcium hydroxide. This is washed, filtered, dried and pulverized to produce a material suitable for use as a paper filler and a paper coating, or for other special uses. The filtrate with the hydroxide of a soluble carbonate in solution, as for example, sodium carbonate, is passed to a carbonator which may be herein termed, for convenience in identification, the "alkali carbonator," and carbon dioxide kiln gas previously produced in the first part of the process, is introduced into the said carbonator to regenerate the water soluble carbonate, as for example, the alkali carbonate, for reuse in the process. The overflow from the primary thickener carrying a portion of the lime in solution, passes to the secondary carbonator, where the remaining lime content is converted to carbonate of lime by treatment with a suitable treating agent. It is desirable to control the pH of the carbonator solution within the range of 9.6 to 9.8. The dilute suspension of calcium carbonate produced in the secondary carbonator is preferably flocculated with flocculating agents of the character hereinbefore set forth, and then passed to a secondary thickener in which the flocculated solids settle out rapidly. The overflow water from the secondary thickener which averages a pH of about 9.7, is returned to the dissolvers for use in dissolving lime from new material. A portion of the process water is preferably admixed with hot make-up water and used in the slaking step. The separated flocculated calcium carbonate is recovered and used for any purpose wherein a pure calcium carbonate finds application.

Hitherto, calcium carbonate for use as a paper filler and a paper coating has been made by precipitating calcium carbonate from solution by introducing therein carbon dioxide or soda ash, but such solutions have had comparatively high concentrations of lime in combined solution and suspension. The present invention distinguishes from such prior processes by recovering the calcium carbonate from very dilute solutions, and an illustrative dilute solution is one (1) part of calcium oxide to 1000 to 1250 parts of water. Using such a dilute solution, by the present invention, a very finely divided precipitated calcium carbonate may be obtained.

The present invention, as above outlined, is illustrated by the following specific example, reference being made to the accompanying flow sheet, No. 1.

The raw dolomite, preferably, has about the following composition:

| | Per cent by weight |
|---|---|
| $CaCO_3$ | 55.20 |
| $MgCO_3$ | 44.06 |
| $SiO_2$ | 0.46 |
| $Fe_2O_3$ | 0.18 |
| $Al_2O_3$ | 0.10 |

The dolomite is calcined in the kiln 1, the calcining being carried out to ensure complete calcining of the calcium and magnesium carbonates with a minimum of overburned lime. It is important for the purpose of the present invention, to ensure the maximum solubility of the calcium oxide in the aqueous dissolving agent, such as water. The lime, preferably while still hot, is passed to a slaker 2 where water is added in a sufficient amount to produce milk of lime. Preferably, the water is heated to a temperature of about 50° C., or above.

When a dry hydrated material was produced and afterwards mixed with water, it was found that the subsequent solubility of the calcium hydroxide was seriously retarded. Therefore, it is essential that more water be used in this step than is necessary merely to convert the calcined material into hydroxide. In practice, it was found that a ratio of 3 parts of hot water by weight to 1 part of oxide solids was sufficient and practicable. However, it is recognized that this ratio may vary somewhat and still come within the spirit of the present invention, depending in some measure upon the character of the lime being treated, as well as other factors.

The milk of lime passes from the slaker to a classifier 3. For the purpose of classification, the milk of lime is greatly diluted. Illustratively, the milk of lime may be converted from a material having a water-lime ratio of 3 to 1, to a suspension in which the ratio of water to calcined dolomite is approximately 16.6 to 1.

The function of the classifier is to remove from the dilute suspension undesirable larger sized solids or aggregates that would tend to degrade the magnesium content of the high magnesia product because of the insolubility of these large sized solids. The classifier also functions to eliminate particles of inadequately dispersed dolomitic lime. Preferably, the classifier 3 is so adjusted, that particles larger than 100 mesh are eliminated. It is obvious that the milk of lime will contain particles which will pass through 100 mesh, some that will pass through 200 mesh, and some that will pass through 300 mesh, or greater. In accordance with the present process, it is highly desirable to put the calcined product in such an initially fine condition as to facilitate the solution of the calcium hydroxide contained therein.

The classified milk of lime passes from the classifier 3 to an agitator 4, where the milk of lime is agitated to disperse further the particles of hydroxides of lime and magnesia. These steps of classification and/or agitation are critical features of the present invention, since the successful solution of the lime content of the suspension is dependent upon thorough mechanical dispersion and violent agitation of the hydroxides to thereby make the process practical by controlling and reducing to a minimum the time in which the solution of the calcium content of the suspension may be accomplished, while simultaneously dissolving and extracting from the suspension a maximum amount of lime. A thorough classification in the classifier 3 results in a removal of undesirable constituents at a point in the process where their removal not only increases the efficiency of the subsequent operations, but results in a magnesium-containing sludge having a higher recoverable magnesia content than would otherwise be obtained.

The thoroughly dispersed suspension of calcium and magnesium hydroxides passes from the agitator 4 to the dissolvers 5, where additional process water is added to greatly dilute the suspension. Illustratively, additional process water may be added so that the water is present in the ratio of one (1) part of calcium oxide in solution to 1000 to 1250 parts of water. The process is preferably carried out at a temperature not greater than ordinary atmospheric temperature, although the liquid must not freeze. The point is that it is not desired to limit this step of the process to solution at atmospheric temperature. Not only is it desirable to have the temperature of the water in the dissolvers as low as possible, since this functions to increase the solution of the calcium hydroxide in the water, but it is desirable to control the pH of the water added in the dissolvers to a range between 9.6 to 9.8. The dissolvers are high speed agitators that produce the violent agitation herein described. This step of the process is a continuous dissolving action which is completed in a few minutes, as for example, in from 2 to 8 minutes. This rapidity of solution of calcium hydroxide has not been obtained in any of the prior art processes.

The solution present in the dissolvers 5 is a dilute solution of lime with magnesium hydroxide and undissolved calcium hydroxide in suspension. To indicate the character of the dilute solution, it may be stated that the solution carries approximately $\frac{8}{10}$ of a gram of calcium hydroxide per liter. From the dissolvers 5, the solution passes to separators or thickeners 6, these thickeners permitting the solids to separate as an underflow product and yielding as an overflow product a substantially clear solution of calcium hydroxide. The time of separation in the thickener 6 may be reduced by the addition of flocculating agents, as hereinbefore set forth.

The underflow from the thickener 6 is treated in any suitable manner to recover the solid content of the thickened sludge. This sludge contains magnesium hydroxide, but may be termed a magnesia sludge, since magnesia may be recovered therefrom by suitable methods. The thickened material is preferably fed to a rotary vacuum filter 18 which reduces the water content of the magnesia sludge.

The calcined magnesia sludge produced in accordance with the present invention, as above set forth, from the dolomite of the composition, herein specifically referred to, has approximately the following composition:

| | Per cent |
|---|---|
| MgO | 90.0 |
| CaO | 9.0 |
| SiO$_2$ | 0.20 |
| Al$_2$O$_3$ | 0.45 |
| Fe$_2$O$_3$ | 0.35 |

The overflow from the separator 6, which is a substantially clear solution of calcium hydroxide, is passed to a primary carbonator 7, where the carbon dioxide is added in the form of scrubbed kiln gases to a point where the pH of the solution is of the order of approximately 11.5 and a controllable portion of the lime has been converted to calcium carbonate.

The carbonation in the primary carbonator 7 is carried out rapidly. It may be stated that the partial carbonation is controlled by the relation of the amount of gas to the amount of liquid, by the time of contact between the gas and liquid, and also by variation of the mechanical agitation whereby the gas is whipped or churned into the liquid as it passes through the carbonator.

As an example of the carbonation operation, gas containing about 16% carbon dioxide is continuously passed through the carbonator for a period of 8 minutes. The amount of gas passed through is that which will precipitate approximately 85% of the calcium content of the liquid, as calcium carbonate.

It has been found that under the conditions above set forth, if more carbon dioxide gas is passed through the liquid than is necessary to precipitate 85% of the calcium carbonate, the resulting carbonate A does not conform to the characteristics above referred to. It is desired to point out that by splitting the carbonation, or carrying it out in two separate stages, there is thereby produced a very high grade calcium carbonate A suitable for paper making, as set forth, and a secondary calcium carbonate B having different characteristics. It is not intended to be limited by the above example. Under changed conditions, a greater or less proportion of the calcium content of the solution in the primary carbonator may be converted into calcium carbonate A. Therefore, it is desired to point out that this aspect of the present invention is not strictly limited to the percentages or the pH set forth. This feature of the invention may be broadly stated to reside in splitting the carbonation and controlling the percentage of carbonation in the primary carbonator, to produce a calcium carbonate A of the character specified.

The water containing the suspension of calcium carbonate passes from the primary carbonator 7 to a primary thickener 8, where the calcium carbonate is separated. The detention, or time of separation, may be reduced in the primary thickener 8 by the use of flocculating agents of the character hereinbefore described.

Two products are recovered from the primary thickener, namely, an underflow consisting of the precipitated calcium carbonate which contains a small percentage of free lime, as for example, 1% to 5%, and an overflow product which contains a controllable proportion of unconverted calcium hydroxide.

The underflow product from the thickener 8 containing a small percentage of calcium hydroxide, is passed to a slurry mixer 9 where an agent is added to convert the calcium hydroxide to calcium carbonate, preferably an alkali carbonate, such as sodium carbonate.

The discharge from the slurry mixer 9 is passed to a continuous filter 10. The valuable content of this filtrate, as for example, sodium hydroxide produced through the reaction of sodium carbonate with the lime, is treated with an agent adapted to regenerate carbonate for reuse in the process. Preferably, this agent is carbon dioxide derived from the calcination of the dolomitic lime.

The calcium carbonate may be treated in any suitable manner to adapt it for commercial utilization. Preferably, it is dried in steam dryers 11 and pulverized in pulverizers 12. It is then packed and shipped as precipitated calcium carbonate 22. This product is a high grade precipitated carbonate having an exceedingly fine and uniform particle size suitable for use as a paper filler and for coating purposes and for all other purposes requiring high grade precipitated calcium carbonate.

The overflow from the primary calcium carbonate thickener 8 passes to the secondary carbonator 13 where most of the calcium hydroxide is converted to calcium carbonate, the carbonation of the process water being preferably carried to the point where its pH is in the approximate range of 9.6 to 9.8. The dilute suspension of calcium carbonate in the process water may have a flocculent introduced therein as at 14 and then be passed to a secondary thickener 15 where the solids are collected rapidly and are recovered as ordinary precipitated calcium carbonate. The overflow of the secondary thickener 15 is process water which preferably is returned to the beginning of the cycle for reuse as the dilution agent for the dolomitic lime.

While the above example is illustrative of one manner of carrying out the present invention, it is not desired to be strictly limited thereto.

Furthermore, while in the specific example set forth, a product is produced which contains approximately 90% magnesia, it is obvious that a product of a greater or less percentage of magnesia may be produced, depending on the amount of calcium removed from the raw material.

Any carbonate rock containing calcium carbonate and magnesium carbonate may be used regardless of whether these ingredients are present in the ratio that they are present in a dolomitic lime. The presence of relatively large amounts of impurities is also permissible, provided these impurities may be separated by classification, or provided these impurities do not affect the quality of the product for the purpose for which it is to be used.

It will be readily appreciated by those skilled in the art that any suitable form of apparatus elements may be employed to effect the necessary and desirable agitation of the materials undergoing the treatment.

It is essential to a full realization of the invention that the admixture passing to the agitator be thoroughly beaten so that the lime particles will be wholly suspended or distributed throughout the water carrying the same and passed in such condition to the dissolver wherein the violent agitation herein described is maintained. Various types of commercial agitators or mixers may, as above indicated, be employed; such, for instance, as those utilizing a high speed impeller coacting with deflecting blades, the action upon the water and the lime particles being such that no settling of the particles can inhere.

In order to illustrate the difference between normal and violent agitation, it may be stated that normal commercial agitation may be defined as agitation required in a mixture of a liquid and finely divided solid particles to maintain the solid particles in suspension throughout the liquid. Such agitation may be carried out in practice by a single agitator comprising an impeller surrounded by stationary curved deflecting blades rotating at a peripheral speed of 700 feet per minute.

In order to illustrate the effect of normal agitation in the dissolvers, it may be stated that in the presence of 1000 parts by weight of water to 1 part of calcium hydroxide dissolved therein under normal agitation, there is obtained a product showing 70% magnesia on a calcined basis, this corresponding to the underflow from the thickener 6. Further, the solution of the calcium hydroxide under these circumstances in the dissolver 5 required from 20 to 25 minutes, and with agitation of this character, it is not practical to produce a 90% MgO product on a calcined basis.

By violent agitation is meant an agitation of the order of about four (4) times the magnitude of normal agitation, above defined.

By increasing the agitation in the dissolvers to four (4) times normal, there was obtained a 90% MgO product on a calcined basis with a solution period of from 2 to 8 minutes, using approximately 1250 parts of water to 1 part of dissolved calcium oxide. This fourfold increase in agitation was obtained by adding the equivalent of two more agitators and increasing the speed of each of the impellers of the composite triplex agitator one-third. In other words, the peripheral speed of each impeller was increased to a little over 900 feet per minute.

The above indicates that the increased agitation may be obtained by the addition of more impellers in the dissolvers, or by increasing the speed of each impeller, but preferably by a combination of the two.

Thus, by reason of the fact that the particles are violently thrown against one another and in intimate admixture with the process water, as well as impacting the walls of the tank or container and the agitator or beater elements, there obtains an attrition of surfaces of the lime particles thereby exposing to the action of the water fresh calcined lime which is more readily dissolved than would otherwise be the case.

As indicated at the outset, the process as above described may be slightly modified to render it more highly efficient and to reduce the size and cost of certain of the apparatus elements which are necessarily employed in carrying out this modified and improved method. So, too, the modification of the process enables one to speed up the operation.

With those points in view, among others, the following exposition is given, reference being had to flow sheet No. 2.

One of the objects of the modified method is to provide means whereby the suspended insoluble magnesia residue that remains after the lime is dissolved in water may be recovered more rapidly and more efficiently than heretofore, and hence permit a corresponding reduction in the size and cost of the settling apparatus which may be employed.

So, too, the modified process provides a similar method of recovering the calcium carbonate precipitated from the solution of lime in water after the insoluble magnesia has been separated from it by causing it to settle more rapidly and more efficiently, and hence permit a corresponding reduction in the size and cost of the settling apparatus that may be required.

As outlined in connection with the first process herein set forth, the lime solution from the dissolvers, with the magnesium hydroxide and some lime in suspension, passes continuously to separators in which the solids are collected and removed. These separators are really thickeners which concentrate a relatively dilute pulp into a thick pulp, and overflow a substantially clear calcium hydroxide solution. Due to the slow settling rate of the suspension, this step of the process as above set forth, requires large settling equipment and long detention time. When the size of the settling equipment and the detention time are kept within practicable limits, an appreciable amount of the magnesia solids is carried off with the overflowing lime solution, decreasing the amount of magnesia recovered in the magnesia product and increasing the magnesia content of the calcium carbonate recovered from the lime solution.

My original application, Serial No. 133,286, recognized the fact that the size of the settling equipment and the detention time may be reduced by the addition of flocculating agents to the feed to the separators. This step may be modified to advantage, whereby there is accomplished a much greater reduction in the size of the settling equipment and in the detention time by greatly increasing the rate of overflow of the separators, and at the same time accomplishing a more complete separation of the suspended solids from the lime solution. This is brought about by seeding the feed to the separators with previously settled solids, and at the same time adding small amounts of flocculating agents.

Suitable flocculating agents are glues and starches. The previously settled solids are preferably the underflow from the seperators.

As an example of the improvement over the first described process in the magnesia separation step which may be accomplished by the method now being described, the following is given: With the natural settling rate of the suspension in the thickener, an overflow rate of 2 feet per hour with a detention of 2½ hours in the thickener, yielded an overflow containing 0.09 gram of suspended solids per liter of overflowing lime solution. With the addition of 1 pound of flocculating agent in the form of cheap starch to 12,000 gallons of water in the thickener feed, an overflow rate of 5 feet per hour with a detention of 1 hour yielded an overflow containing 0.08 gram of suspended solids per liter of overflowing lime solution.

On seeding the feed to the thickener with 5 parts by weight of previously settled solids to 1 part by weight of solids suspended in the dissolver discharge flowing to the thickener and adding at the same time 1 pound of flocculating agent in the form of cheap starch to 12,000 gallons of water in the thickener feed, an overflow rate of 10 feet per hour with a detention of half an hour in the thickener, yielded an overflow containing only 0.04 gram of suspended solids per liter of overflowing lime solution.

This improvement in the separation step enables one to reduce the size of the settling equipment required to one-fifth and at the same time reduces the amount of suspended magnesia solids carried over in the lime solution more than one-half as compared with the natural settling rate. It likewise enables one to reduce the size of the settling equipment required to one-half that required when the flocculating agent alone is used, and at the same time reduces the amount of suspended magnesia solids carried over in the lime solution one-half.

In the process set forth in the early part of this specification, and as depicted in my copending application, Serial No. 133,286, the lime solution overflowing from the magnesia separators is carbonated in two stages, and the calcium carbonate formed in each stage is recovered by settling in thickeners. The overflow water of the second thickener is process water substantially free of lime that is returned to the dissolvers for reuse.

The thickeners concentrate relatively dilute suspensions of calcium carbonate into a thick pulp and overflow a substantially clear water. The overflow of the first thickener contains a substantial proportion of the lime in solution which is carbonated and then flows to the second thickener. The second thickener removes this calcium carbonate and overflows process water substantially free of lime.

Due to the slow settling rates of the minutely divided suspensions of calcium carbonate, these two settling steps of the process require large settling equipment and long detention time. When the size of the settling equipment and the detention time are kept within practicable limits, a small amount of the suspended calcium carbonate solids is carried off in the process water and is carried back with it to the magnesia thickeners where it is settled with the magnesia underflow of the magnesia thickeners and decreases the magnesia content of the magnesia product.

My copending application, Serial No. 133,286, discloses that the size of the second calcium carbonate thickener and the detention time in it may be reduced by the addition of flocculating agents to the feed to this thickener. An object of the process now being set forth is to provide a modification of the calcium carbonate recovery step whereby the lime is recovered from the lime solution overflowing from the magnesia separators in a single carbonation step, wherein the rate of settling of the suspended calcium carbonate solids is greatly accelerated.

This acceleration in the rate of settling of the suspended calcium carbonate permits greatly increasing the rate of overflow of the process water from the calcium carbonate thickener and greatly decreasing the detention time, whereby a much greater reduction in the size of this settling equipment is obtained, and at the same time, a more complete separation of the suspended calcium carbonate from the process water is achieved, with a corresponding increase in the magnesia content of the magnesia product settled in the magnesia separators. This is accomplished by seeding the feed to the calcium carbonate thickener with previously settled solids and by a further addition of a flocculating agent to the feed to the thickener. The previously settled solids are the underflow from this calcium carbonate thickener.

An example of the improvement in the calcium carbonate separation step as set forth in the foregoing portion of this case and as depicted in my application, Serial No. 133,286, which is accomplished by the method of the modified process now being described, is as follows: With the natural settling rate of the calcium carbonate suspension in the thickener, an overflow rate of ⅝ foot per hour and a detention time of 6 hours in the thickener, yields an overflow of process water containing 0.12 gram of calcium carbonate per liter of overflowing process water. The addition of 1 pound of flocculating agent in the form of cheap starch to 12,000 gallons of water in the thickener feed, with an overflow rate of 5 feet per hour and a detention of 1 hour, yielded an overflow of process water containing 0.13 gram of calcium carbonate per liter of overflowing process water.

On seeding the feed to the thickener with 5 parts by weight of previously settled calcium carbonate to 1 part by weight of suspended calcium carbonate in the feed to the thickener, and adding 1 pound of flocculating agent in the form of cheap starch to 12,000 gallons of water in the seeded thickener feed, an overflow rate of 10 feet per hour with a detention of ½ hour is obtained, and at the same time the amount of calcium carbonate remaining in suspension in the process water overflowing from the thickener is reduced to .05 gram per liter of process water. This improvement in the calcium carbonate recovery step reduces the size of the settling equipment required to 1/12 and at the same time reduces the amount of suspended calcium carbonate carried by the process water into the magnesia separators to less than one-half as compared with the natural settling rate, and reduces the size of the settling equipment required to ½ that required when the flocculating agent alone was used and at the same time reduced the amount of suspended calcium carbonate carried by the process water into the magnesia separators to much less than ½.

The above examples are illustrative of the amounts of recirculated solids and the amounts of flocculating agents that will produce the results described. This invention is not limited however, to the use of the ratios of previously settled solids or to the amounts of flocculating agents given in the examples.

Less acceleration of the settling rates over the original settling rates can be obtained by the addition of less solids and less flocculating agents than used in the examples. The addition of larger amounts of solids requires the addition of larger amounts of flocculating agents without corresponding decrease in the rate of settling and in the detention time required.

The calcium carbonate recovered by the above steps of this invention is ordinary precipitated calcium carbonate and does not meet the rigid requirements of the highest grades of precipitated calcium carbonate. The next step in this invention is to convert this calcium carbonate into a precipitated calcium carbonate that meets the most rigid requirements of the highest grades of precipitated calcium carbonate.

The calcium carbonate sludge, being the underflow of the thickener, is calcined to produce lime. The lime is slaked to a milk of lime by the addition of an amount of water equal to 4 parts of water by weight to 1 part of lime by weight. The milk of lime is allowed to cool to a temperature of about 40° C. and diluted by adding an amount of water equal to that used in slaking. The diluted milk of lime is then screened or classified to under 100 mesh to remove foreign material and any uncalcined residues that it may contain.

The classified or screened diluted milk of lime is then carbonated in a mechanical agitator which keeps it in normal agitation during the carbonation. During the carbonation step, carbon dioxide, preferably in the form of kiln gases containing somewhat less than 10% $CO_2$, is slowly introduced into the agitator. The temperature of the liquid in the agitator is controlled by the introduction of a volume of air such that the temperature is kept under 60° C., so that the calcium carbonate particles form as calcite and not as aragonite. The carbonation should be continued until the pH of the liquid is below 8. This will ordinarily require at least 8 hours. The carbonated material is then allowed to "age" for 16 hours during which "ageing" it is slowly agitated. The step of "ageing" with slow agitation assures uniformity in particle size and complete carbonation of the lime. Upon completion of the "ageing" process, the calcium carbonate is recovered by filtering, drying and pulverizing.

The calcium carbonate prepared in this way meets the rigid requirements as to fineness and uniformity of particle size for the highest grades of precipitated calcium carbonate. It is a substantially chemically pure calcium carbonate in that the insoluble impurities of the original rock, that are retained in processes that make precipitated calcium carbonate directly from limestones, are separated from it during the intermediate lime solution step of the magnesia separation process.

As a further modification of the original process set forth in my copending application, Serial No. 133,286, the following additions and changes may be made therein.

Return solids and a flocculant may be added to the material passing from the dissolvers 5 to the separators 6, the solids being taken from the underflow of the separators (thickeners) 6. Again, the material passing from the primary carbonator 7 to the primary thickener 8 may have introduced into the same return solids as a part of the underflow from the primary thickener 8 and a flocculant. Furthermore, in the line passing from the carbonator 13 to the secondary thickener 15, one may introduce return solids taken for instance from the underflow of said thickener. The process water will be discharged directly into the line leading to the classifier 3, instead of being primarily admixed with the hot water.

These various changes or additions are indicated by dotted lines on flow sheet No. 1.

What is claimed is:

1. The continuous process of treating limestone having calcium and magnesium components, comprising calcining said limestone to soft-burned lime, slaking the soft-burned lime while hot with an excess of hot water to form a milk of lime of finely divided particles and separating the particles in excess of 100 mesh size, dispersing the remaining particles under 100 mesh size by agitation, subjecting said higly dispersed and finely divided particles of magnesia-containing lime hydroxide to the dissolving action of water having a pH within the range of approximately 9.6 to 9.8, said water being present in the ratio of 1000 to 1250 parts to 1 part of CaO dissolved therein with violent agitation to produce a dilute solution containing dissolved therein substantially all the resulting calcium hydroxide and with the relatively insoluble magnesium hydroxide and the remaining unsubstantial amount of undissolved calcium hydroxide held in suspension, separating the undissolved magnesia-containing particles from the water containing the dissolved lime and recovering them, treating the water containing the lime in solution with $CO_2$ to reduce the alkalinity of the solution to about a pH equal to 9.6 to 9.8, whereby a finely divided calcium carbonate is precipitated, separating the calcium carbonate from the water with a pH equal to 9.6 to 9.8 and recovering it, and reusing such water to dissolve lime from the highly dispersed and finely divided suspension of magnesia-containing lime hydroxide particles.

2. The continuous process of treating limestone having calcium and magnesium components comprising calcining said limestone to produce a soft-burned CaO component and carbon dioxide, slaking the calcined material while hot with an excess of hot water to form a milk of lime, and reducing the solid particles present in said milk of lime to a finely divided and dispersed state by agitation, whereby the calcium content is made more completely amenable to solution, subjecting said dispersed particles to the action of an aqueous dissolving agent with violent agitation to produce a dilute solution containing dissolved therein substantially all the resulting calcium hydroxide and with the relatively insoluble magnesium hydroxide and the remaining unsubstantial amount of undissolved calcium hydroxide held in suspension, thickening said dilute solution to separate the major portion of the undissolved components from the dilute solution of calcium hydroxide, carbonating the relatively clear solution of calcium hydroxide to convert a portion of the calcium content thereof into a product consisting primarily of extremely fine calcium carbonate, and separating said calcium carbonate from the solution containing some unconverted calcium hydroxide, thereby recovering separately the insoluble magnesium hydroxide and the precipitated calcium carbonate.

3. The continuous process of treating limestone having magnesium and calcium components comprising calcining said limestone at a temperature adapted to produce soft-burned CaO, slaking the calcined limestone while it is still hot with water having a temperature above 50° C., the amount of water being sufficiently in excess of the chemical requirements of the hydrates to form a milk of lime, and reducing the solid particles present in said milk of lime to a finely divided and dispersed state by agitation, whereby the calcium content is made more completely amenable to solution, subjecting said dispersed particles to the action of water with violent agitation to produce a dilute solution containing dissolved therein substantially all the resulting calcium hydroxide and with the relatively insoluble magnesium hydroxide and the remaining unsubstantial amount of undissolved calcium hydroxide in suspension, thickening the so-treated product to remove the major portion of the undissolved magnesium and calcium hydroxides, carbonating the relatively clear solution until the pH of the solution is approximately 11.5, whereby a portion of the dissolved lime content of the solution is converted into calcium carbonate, thickening the carbonated solution to produce a primary sludge consisting principally of calcium carbonate containing some calcium hydroxide, and a separate secondary solution containing unconverted calcium hydroxide, carbonating the primary sludge to convert the contained calcium hydroxide into a carbonate, carbonating said secondary solution, to connect the calcium hydroxide dissolved in it into calcium carbonate, and recovering separately the insoluble magnesium hydroxide and the precipitated carbonate.

4. The continuous process of treating limestone having calcium and magnesium components comprising calcining said limestone to produce a soft-burned CaO component and carbon dioxide, slaking the calcined material with an excess of hot water to form a milk of lime, and reducing the solid particles present in said milk of lime to a finely divided and dispersed state, whereby the calcium content is made more completely amenable to solution, subjecting said dispersed particles to the action of water with violent agitation to produce a dilute solution containing dissolved therein substantially all the resulting calcium hydroxide and with the relatively insoluble magnesium hydroxide and the remaining unsubstantial amount of undissolved calcium hydroxide in suspension, thickening said dilute solution to remove the major portion of the undissolved magnesium and calcium hydroxide and to form a relatively clear solution of calcium hydroxide, subjecting said clear solution to a primary carbonation by passing therein $CO_2$ gas produced in the calcining step until the pH of the solution is approximately 11.5 to thereby convert a portion of the dissolved lime content into calcium carbonate, separating said calcium carbonate from the solution containing unconverted calcium hydroxide, subjecting said latter solution to a secondary carbonation step to convert the calcium hydroxide dissolved in it into calcium carbonate, and recovering separately the insoluble magnesium hydroxide and the precipitated calcium carbonate.

5. The continuous process of treating limestone having magnesium and calcium components comprising calcining said material at a temperature adapted to produce soft-burned CaO, slaking the calcined limestone while it is still hot with water having a temperature above 50° C., the amount of water being sufficiently in excess of the chemical requirements of the hydrates to form a milk of lime, and reducing the solid particles present in said milk of lime to a finely divided and dispersed state, whereby the calcium content is made more completely amenable to solution, subjecting said dispersed particles to the action of water with violent agitation to produce a dilute solution containing dissolved therein substantially all the resulting calcium hydroxide and with the relatively insoluble magnesium hydroxide and the remaining unsubstantial amount of undissolved calcium hydroxide held in suspension, thickening the dilute solution to remove the major portion of the undissolved magnesium and calcium hydroxides and to form a relatively clear solution, subjecting said clear solution to a primary carbonation by passing therein $CO_2$ gas produced in the calcining step until the pH of the solution is approximately 11.5 to thereby convert a portion of the dissolved lime content into calcium carbonate, separating said calcium carbonate from the solution containing unconverted calcium hydroxide, subjecting said latter solution to a secondary carbonation step until the pH of the solution is within the range of 9.6 to 9.8 to convert the calcium hydroxide dissolved in it into calcium carbonate and recovering separately the insoluble magnesium hydroxide and the precipitated calcium carbonate.

6. The continuous process of treating limestone having magnesium and calcium components comprising calcining said limestone at a temperature adapted to produce a soft-burned CaO component, slaking the calcined limestone while it is still hot with water having a temperature above 50° C., the amount of water being sufficiently in excess of the chemical requirements of the hydrates to form a milk of lime, classifying the milk of lime to remove large or heavy aggregates, agitating the milk of lime to divide and disperse the particles of calcium hydroxide and magnesium hydroxide, adding more water and subjecting the resulting dilute milk of lime to violent agitation to produce a dilute solution containing substantially all the resulting calcium hydroxide with the relatively insoluble magnesium hydroxide and the remaining unsubstantial amount of undissolved calcium hydroxide held in suspension, thickening the resulting solution containing dissolved calcium hydroxide and undissolved calcium and magnesium hydroxides in suspension, separating and recovering a clear solution of calcium hydroxide and magnesia sludge, treating the clear solution of calcium hydroxide with $CO_2$ gas to convert the calcium hydroxide to calcium carbonate, and recovering the calcium carbonate from the solution.

7. The continuous process comprising classifying an aqueous suspension of calcium and magnesium hydroxides to remove unusable materials, subjecting the so-classified suspension to agitation to reduce the particles present in said suspension to a finely divided and dispersed state, whereby the calcium content is more completely amenable to solution, subjecting said finely dispersed particles to intimate contact with water by means of violent agitation to produce a dilute solution containing dissolved calcium hydroxide and undissolved calcium and magnesium hydroxides in suspension, separately recovering from said dilute solution the major portion of the undissolved magnesium and calcium hydroxides and a relatively clear solution containing dissolved calcium hydroxide, subjecting said relatively clear solution to treatment with $CO_2$ to convert a controllable portion of the calcium content to calcium carbonate, separating the resulting calcium carbonate from the solution, treating the remaining solution with $CO_2$ to convert the remaining calcium hydroxide of the solution to calcium carbonate, and separately recovering the resulting precipitated calcium carbonate.

8. The continuous process comprising classifying an aqueous suspension of calcium and magnesium hydroxides to remove hydroxide particles larger than 100 mesh and particles heavier than the hydroxides overflowed, subjecting the so-classified suspension to agitation to reduce the particles present in said suspension to a finely divided and dispersed state, whereby the calcium content is more completely amenable to solution, subjecting said finely dispersed particles to intimate contact with water by means of violent agitation to produce a dilute solution containing dissolved therein substantially all the resulting calcium hydroxide and with the relatively insoluble magnesium hydroxide and the remaining unsubstantial amount of undissolved calcium hydroxide held in suspension, separately recovering from said dilute solution the major portion of the undissolved magnesium and calcium hydroxides and a relatively clear solution containing dissolved calcium hydroxide, subjecting said relatively clear solution to treatment with $CO_2$ to convert a controllable portion of the dissolved calcium hydroxide to calcium carbonate, separating the resulting calcium carbonate, treating the remaining solution again with $CO_2$ to convert the remaining dissolved calcium hydroxide in the solution to calcium carbonate, and separately recovering the resulting precipitated calcium carbonates.

9. In the continuous process of treating an aqueous solution containing dissolved calcium hydroxide, the steps of carbonating the solution until the pH thereof is approximately 11.5 whereby a portion of the dissolved calcium hydroxide content is converted into calcium carbonate, consisting primarily of finely divided material, stopping the carbonation at such point, and removing the carbonate thus formed.

10. In the continuous process of recovering lime from limestone having calcium and magnesium components, the steps of calcining the limestone at a temperature adapted to produce a soft-burned CaO component, slaking the calcined limestone while it retains a portion of its internal heat, but insufficient to produce a great amount of steam, whereby the solubility of the calcium hydroxide in water is increased, subjecting the slaked lime to the action of water having a pH of a range of approximately 9.6 to 9.8 with violent agitation to produce a dilute solution of substantially all the calcium hydroxide with the relatively insoluble magnesium hydroxide and the remaining unsubstantial amount of undissolved calcium hydroxide held in suspension, removing the insoluble magnesium hydroxide and undissolved calcium hydroxide from the dilute solution, carbonating the remaining solution containing dissolved calcium hydroxide until the pH thereof is approximately 11.5, whereby a portion of the dissolved calcium hydroxide is converted into calcium carbonate consisting primarily of finely divided material, stopping the carbonation at such point, and removing the carbonate thus formed.

11. In the continuous process of recovering lime from limestone having calcium and magnesium components, the steps of calcining the limestone at a temperature adapted to produce a soft-burned CaO component, slaking the calcined limestone while it retains a portion of its internal heat, but insufficient to produce a great amount of steam, whereby the solubility of the calcium hydroxide in water is increased, subjecting the slaked lime to the action of water having a pH within the range of approximately 9.6 to 9.8 with violent agitation to produce a dilute solution of substantially all the calcium hydroxide with the relatively insoluble magnesium hydroxide and the remaining unsubstantial amount of undissolved calcium hydroxide held in suspension, the water being present in the ratio of 1000 to 1250 parts to 1 part of calcium oxide in solution, removing the insoluble magnesium hydroxide and undissolved calcium hydroxide from the dilute solution, carbonating the remaining solution containing dissolved calcium hydroxide until the pH thereof is approximately 11.5, whereby a portion of the dissolved calcium hydroxide is converted into calcium carbonate consisting primarily of finely divided material, stopping the carbonation at such point, and removing the carbonate thus formed.

12. The continuous process of treating limestone having calcium and magnesium components comprising calcining said limestone to soft burn the CaO component, slaking the calcined limestone while still hot with an excess of hot water to form a milk of lime, and reducing the solid particles present in said milk of lime to a finely divided and dispersed state, whereby the calcium content is made more completely amenable to solution, subjecting said dispersed particles to the action of water having a pH within the range of approximately 9.6 to 9.8 with violent agitation, said water being present in the ratio of 1000 to 1250 parts to 1 part of CaO in solution to thereby produce a dilute solution containing dissolved therein substantially all the resulting calcium hydroxide and with the relatively insoluble magnesium hydroxide and the remaining undissolved calcium hydroxide held in suspension, recovering said dissolved and undissolved calcium hydroxide and the insoluble magnesium hydroxide from the dilute solution, producing a product containing not less than 90% MgO on a calcined basis, carbonating the dilute solution from which the particles in suspension have been removed to convert the dissolved calcium hydroxide content thereof into a product consisting primarily of finely divided calcium carbonate, separating said calcium carbonate from the solution, and using the so-exhausted dilute solution to dissolve lime from the highly dispersed, finely divided suspension of magnesia-containing lime hydroxide particles.

13. The continuous process of treating limestone having calcium and magnesium components comprising calcining said limestone to soft burn the CaO component, slaking the calcined limestone while still hot with an excess of hot water to form a milk of lime, and reducing the solid particles present in said milk of lime to a finely divided and dispersed state, whereby the calcium content is made more completely amenable to solution, subjecting said suspension of dispersed particles to the action of water having a pH within the range of approximately 9.6 to 9.8, said water being present in the ratio of 1000 to 1250 parts to 1 part of CaO in solution while subjecting said suspension to violent agitation for a period of the order of 2 to 8 minutes, to thereby produce a dilute solution containing dissolved therein substantially all the resulting calcium hydroxide and with the relatively insoluble magnesium hydroxide and the remaining undissolved calcium hydroxide held in suspension, recovering said dissolved and undissolved calcium hydroxides and the insoluble magnesium hydroxide from the dilute solution, carbonating the dilute solution from which the particles in suspension have been removed to convert the dissolved calcium hydroxide content thereof into a product consisting primarily of finely divided calcium carbonate, separating said calcium carbonate from the solution, and reusing the so-exhausted dilute solution to dissolve lime from the highly dispersed, finely divided suspension of magnesia-containing lime hydroxide particles.

14. In the method of dissolving lime from a finely divided and highly dispersed suspension of magnesia-containing lime hydroxide particles by mixing the suspension with 1000 to 1250 parts of water to 1 part of lime in solution, the step of greatly reducing the solution time by agitating the mixture at more than the herein described normal agitation.

15. In the method of producing a magnesia product containing not less than 90% MgO from a finely divided and highly dispersed suspension of magnesia-containing lime hydroxide particles by dissolving lime through the addition of 1000 to 1250 parts of water to 1 part of lime in solution, the step of reducing the solution time to the order of approximately 2 to 8 minutes by agitating the solution at about four times the herein described normal agitation.

16. In the continuous process of separating lime and magnesia from magnesia-containing limestones based on the solubility of lime hydroxide in water as set forth in claim 6, the step of effecting the rapid separation of the less soluble magnesia-containing residual particles from the dissolved lime by the addition of both a flocculating agent and previously settled solids.

17. In the continuous process of separating lime and magnesia from magnesia-containing limestones based on the solubility of lime hydroxide in water as set forth in claim 6, the step of accelerating the settling rate of the less soluble magnesia-containing particles through the addition of one pound of flocculating agent in the form of starch to twelve thousand gallons of water in the feed to a thickener and five parts by weight of previously settled solids to one part by weight of solids suspended in the dissolver discharge flowing to the thickener, whereby the size of the settling apparatus required may be reduced to one-fifth of the size required with the natural settling rate.

18. In the continuous method of separating precipitated calcium carbonate from the aqueous solution of lime obtained in the process of separating lime from magnesia-containing limestones based on the solubility of lime hydroxide in water as set forth in claim 6, the step of accelerating the separation of precipitated calcium carbonate from the water by the addition of both a flocculating agent and previously settled calcium carbonate.

19. In the continuous method of separating precipitated calcium carbonate from the aqueous solution of lime obtained in the process of separating lime from magnesia-containing limestones based on the solubility of lime hydroxide in water as set forth in claim 6, the step of accelerating the setting rate of calcium carbonate from the water, which consists in adding approximately one pound of flocculating agent in the form of starch to approximately twelve thousand gallons of water and adding five parts by weight of previously settled calcium carbonate to one part by weight of calcium carbonate suspended in the carbonator discharge flowing to the thickener, whereby the size of the settling apparatus required may be reduced to one-twelfth of the size required with the natural settling rate.

20. In the continuous process of separating lime and magnesia from magnesia-containing limestones based on the solubility of lime hydroxide in water as set forth in claim 6, the step of increasing the rate of separation of the less soluble magnesia-containing residual particles from the dissolved lime wherein a flocculating agent is used, which step consists in adding previously settled solids to the solution.

21. In the continuous process of separating lime and magnesia from magnesia-containing limestones based on the solubility of lime hydroxide in water as set forth in claim 6, the steps of accelerating the settling rate of the less soluble magnesia-containing particles through the addition of one pound of flocculating agent in the form of starch to twelve thousand gallons of water in the feed to a thickener, and of further accelerating the settling rate by the addition of five parts by weight of previously settled solids to one part by weight of solids suspended in the dissolver discharge flowing to the thickener, whereby the size of the settling apparatus required may be reduced to one-half of the size required when the flocculating agent alone is used.

22. In the continuous method of separating precipitated calcium carbonate from the aqueous solution of lime obtained in the process of separating lime from magnesia-containing limestones based on the solubility of lime hydroxide in water as set forth in claim 6, the step of increasing the rate of separation of the precipitated calcium carbonate from the water wherein a flocculating agent is used, which step consists in adding to the solution previously settled calcium carbonate.

23. In the continuous method of separating precipitated calcium carbonate from the aqueous solution of lime obtained in the process of separating lime from magnesia-containing limestones based on the solubility of lime hydroxide in water as set forth in claim 6, the steps of acclerating the settling rate of the calcium carbonate by the addition of one pound of flocculating agent in the form of starch to twelve thousand gallons of water in the feed to a thickener, and of further accelerating the settling rate by the addition of five parts by weight of previously settled calcium carbonate to one part by weight of calcium carbonate suspended in the carbonator discharge flowing to the thickener, whereby the size of the settling apparatus required may be reduced to one-half of the size required when the flocculating agent alone is used.

24. In the continuous process of separating lime and magnesia from magnesia-containing limestones based on the solubility of lime hydroxide in water as set forth in claim 6, the step of producing a chemically pure, finely divided, high grade precipitated calcium carbonate from the ordinary precipitated calcium carbonate recovered in the separation process by recalcining, slaking, and recarbonating the precipitated calcium carbonate recovered in the process.

25. In the continuous process of separating lime and magnesia from magnesia-containing limestones based on the solubility of lime hydroxide in water as set forth in claim 6, the steps which consist of calcining the recovered calcium carbonate to lime, slaking the lime with four parts by weight of water, cooling the hydrate to about 40° C. and adding an equal amount of water, classifying the milk of lime to under 100 mesh, carbonating the classified milk of lime until the pH of the liquid is less than 8 at a temperature under 60° C. while subjecting it to normal agitation, and ageing the carbonated material for a period of the order of 16 hours while subjecting it to less than normal agitation, to produce a chemically pure, finely divided, high grade precipitated calcium carbonate.

26. The continuous process comprising classifying an aqueous suspension of calcium and magnesium hydroxides to remove unusable materials, subjecting the so-classified suspension to agitation to reduce the particles present in said suspension to a finely divided and dispersed state, whereby the calcium content is more completely amenable to solution, subjecting said finely dispersed particles to intimate contact with water by means of violent agitation to produce a dilute solution containing dissolved therein substantially all the resulting calcium hydroxide and with the relatively insoluble magnesium hydroxide and the remaining unsubstantial amount of undissolved calcium hydroxide in suspension, separately recovering from said dilute solution the major portion of the undissolved magnesium and calcium hydroxides and a relatively clear solution containing dissolved calcium hydroxide, subjecting said relatively clear solution to treatment with $CO_2$ to convert a controllable portion of the calcium content to calcium carbonate, separating the resulting calcium carbonate from the solution, treating the remaining solution with $CO_2$ to convert the remaining calcium hydroxide of the solution to calcium carbonate, and separately recovering the resulting precipitated calcium carbonate.

27. The continuous process comprising classifying an aqueous suspension of calcium and magnesium hydroxides to remove unusable materials, subjecting the so-classified suspension to agitation to reduce the particles present in said suspension to a finely divided and dispersed state, whereby the calcium content is more completely amenable to solution, subjecting said finely dispersed particles to intimate contact with additional water by means of violent agitation to produce a dilute solution containing the major portion of the calcium hydroxide dissolved therein and undissolved calcium and magnesium hydroxides in suspension, separately recovering from said dilute solution the major portion of the undissolved magnesium and calcium hydroxides and a relatively clear solution containing dissolved calcium hydroxide, subjecting said relatively clear solution to treatment with $CO_2$ to convert a controllable portion of the calcium content to calcium carbonate, and separating the resulting calcium carbonate from the solution.

28. The continuous process of recovering lime from limestone having calcium and magnesium components comprising calcining the limestone at a temperature adapted to produce a soft burned CaO component, slaking the calcined limestone while still hot to produce a milk of lime, classifying the resulting aqueous suspension of calcium and magnesium hydroxides to remove unusable materials, subjecting the so-classified suspension to agitation to reduce the particles present in said suspension to a finely divided and dispersed state, whereby the calcium content is more completely amenable to solution, subjecting said finely dispersed particles to intimate contact with additional water by means of violent agitation to produce a dilute solution containing the major portion of the calcium hydroxide dissolved therein and undissolved calcium and magnesium hydroxides in suspension, separately recovering from said dilute solution the major portion of the undissolved magnesium and calcium hydroxides and a relatively clear solution containing dissolved calcium hydroxide, subjecting said relatively clear solution to treatment with $CO_2$ to convert a controllable portion of the calcium content to calcium carbonate, and separating the resulting calcium carbonate from the solution.

WILLIAM J. YOUNG.

CERTIFICATE OF CORRECTION.

Patent No. 2,196,949.  April 9, 1940.

WILLIAM J. YOUNG.

It is hereby certified that error appears in the printed specification of the above numbered patent requiring correction as follows: Page 8, second column, line 21, claim 1, for "higly" read --highly--; page 9, first column, line 32, claim 3, for "connect" read --convert--; line 54-55, claim 4, for "hydroxide" read --hydroxides--; and second column, line 44, claim 6, for the word "dilute" read --diluted--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.